Sept. 27, 1966            C. WEILAND            3,275,090
METHOD AND APPARATUS FOR INCREASING THE EFFECTIVENESS
OF AIR CUSHION VEHICLES
Filed Oct. 16, 1958                                       2 Sheets-Sheet 1
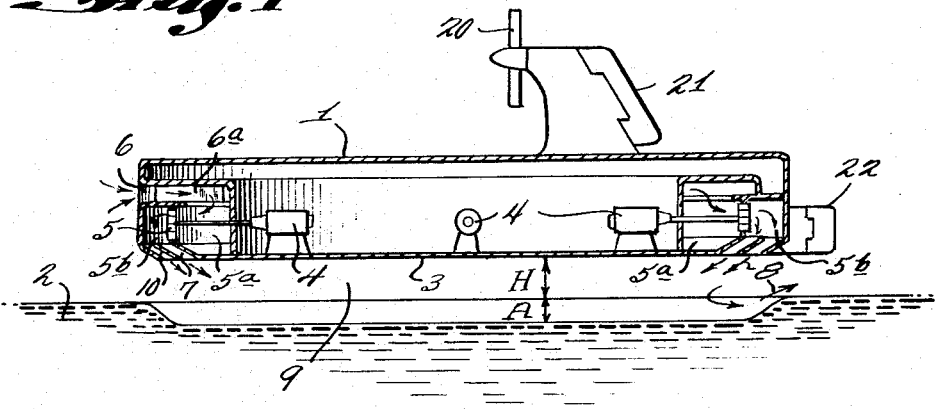
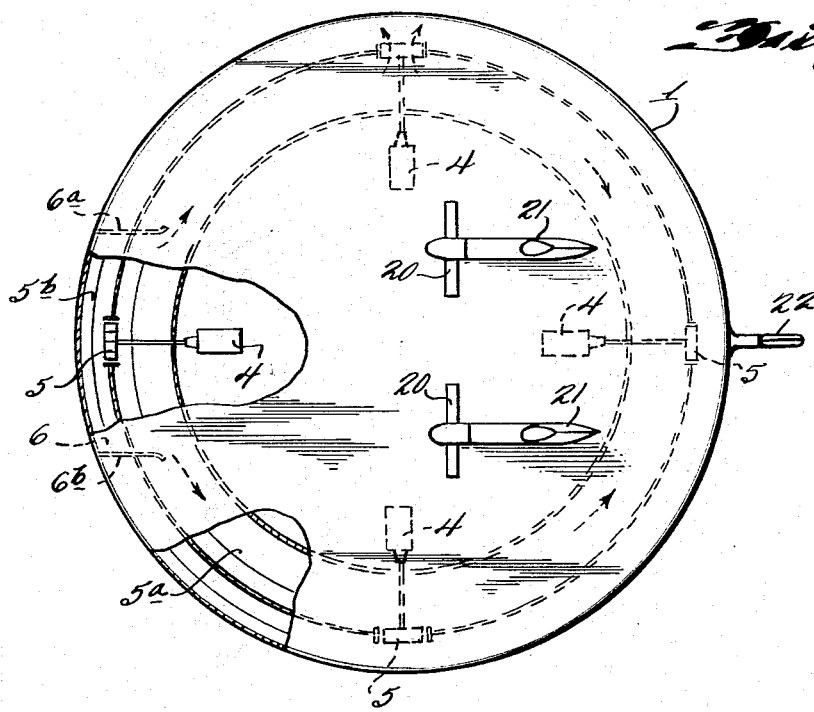
INVENTOR
CARL WEILAND
BY
ATTORNEYS Sept. 27, 1966　　　　　　　C. WEILAND　　　　　　　3,275,090
METHOD AND APPARATUS FOR INCREASING THE EFFECTIVENESS
OF AIR CUSHION VEHICLES
Filed Oct. 16, 1958　　　　　　　　　　　　2 Sheets-Sheet 2
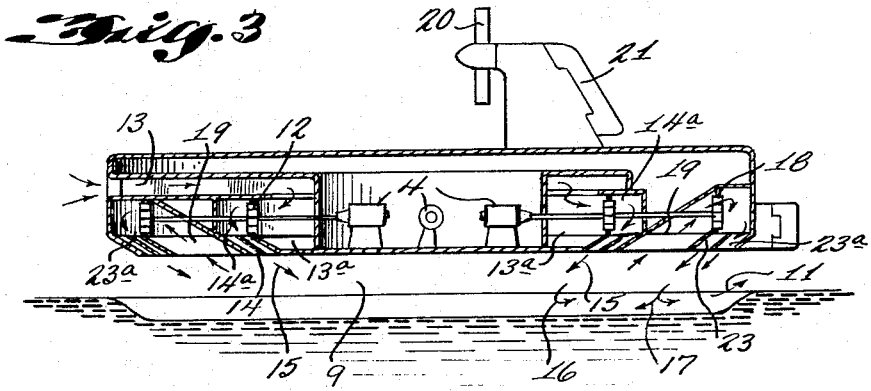
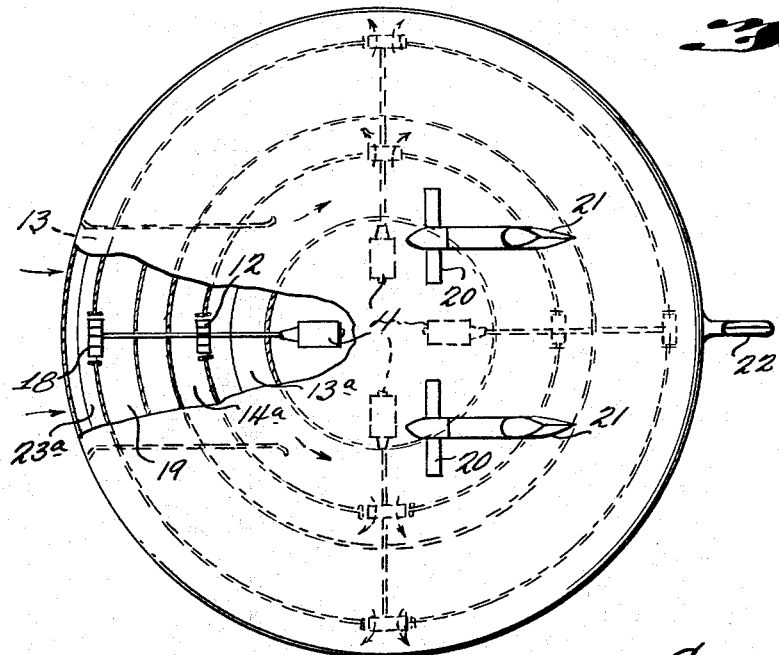
INVENTOR
CARL WEILAND United States Patent Office 3,275,090
Patented Sept. 27, 1966

3,275,090
METHOD AND APPARATUS FOR INCREASING THE EFFECTIVENESS OF AIR CUSHION VEHICLES
Carl Weiland, Seefeldstrasse 124, Zurich, Switzerland
Filed Oct. 16, 1958, Ser. No. 767,575
Claims priority, application Switzerland, Oct. 22, 1957, 51,837
18 Claims. (Cl. 180—7)

This invention relates to a transportation method and vehicle, and refers more particularly to so-called ground-effect machines, i.e. vehicles which may be moved over a surface with a cushion of air interposed between vehicle and surface. The subject matter of the invention is particularly suitable for use as a boat over water, namely, upon rivers, seas and oceans, although it is also suitable for ground transportation, including ground covered with ice, snow, sand and marshes.

An eternal transportation problem is to provide means for moving weights and loads with the least possible expenditure of power, so that the force necessary for the movement of a vehicle should be as small as possible in relation to the weight of the load which is being transported. When a vehicle is moved through air or water, its carrying force, namely, the lift or buoyancy is produced by static or dynamic means. A substantial drawback, particularly in the case of boats and ships, is the fact that the ratio of the resistance to the movement of the vehicle to the buoyancy reaches a value in the case of great speeds which is uneconomical to a large extent.

An object of the present invention is the provision of an aerostatically supported vehicle and transportation method which will not have the above mentioned drawbacks.

Other objects of the present invention will become apparent in the course of the following specification.

In accomplishing the objects of the present invention, it was found desirable to provide between the vehicle and the surface supporting the same a cushion of compressed air which will lift the vehicle from the supporting surface for the purpose of substantially reducing frictional resistance which would be otherwise encountered by the vehicle during its transportation. Thus, the present invention contemplates the use of an aerostatic lift for a rigid body serving as a vehicle, or used for other purposes.

The invention will appear more clearly from the following detailed description when taken in connection with the accompanying drawings showing by way of example preferred embodiments of the inventive idea.

In the drawings:

FIGURE 1 is a vertical sectional view of a vehicle constructed in accordance with the principles of the present invention, and utilizing a unidirectional current.

FIGURE 2 is a top view of the device shown in FIGURE 1, some parts being shown in section.

FIGURE 3 is a view corresponding to FIGURE 1 but showing a vehicle utilizing polydirectional current.

FIGURE 4 is a top view of the device shown in FIGURE 3, some parts being shown in section.

The apparatus shown in FIGURES 1 and 2 is of the type commonly referred to as ground-effect machine and comprises a body 1 which may have any suitable outline.

While FIGURE 2 indicates that the apparatus shown therein is round, obviously it may have a rectangular or square shape.

The bottom 3 of the vehicle 1, while the latter is not in use, floats upon the water surface 2 and can be flat or curved, in accordance with the static technical requirements which should take into consideration the rigidity and the flow conditions of the vehicle.

The interior of the body 1 contains blowers or blast engines 5 which are driven by motors 4 and which suck in atmospheric air through an air forwardly directed intake opening 6. The air intake opening 6 communicates over a radially extending channel delimited by side walls 6a, 6b with an annular distribution chamber 5a. The blowers 5 which are evenly distributed over the circumference of annular chamber 5a then deliver the air from chamber 5a to annular pressure chamber 5b surrounding chamber 5a. Compressed air in chamber 5b is ejected through air outlet openings 7, in the form of inwardly inclined nozzles. The openings 7 located upon the entire periphery of the vehicle 1 are so shaped that a flow of compressed air takes place at the edges in the direction of the arrows 8 i.e. radially inwardly and downwardly directed with respect to the vehicle. Thus, an air cushion is formed in the space 9 located between the bottom 3 of the vehicle 1 and the surface of the water. The pressure in the air cushion is higher than atmospheric pressure. After initial operations, this air cushion is permanently maintained under the vehicle. The extent of pressure of this air cushion can be conveniently regulated by regulating the blowers 5 depending upon the weight and the transportation requirements. Due to the pressure drop from the cushion in space 9 to atmosphere surrounding the vehicle there will be a marked tendency of the air in the cushion to escape from under the vehicle and consequently a radially and outwardly directed flow of air will be set up at the rim of the bottom 3. In order to maintain the air cushion an amount of air corresponding to that which escapes to the atmosphere must constantly be supplied by the blowers 5. However, with the inwardly inclined nozzles or openings 7 an inwardly directed velocity component will be imparted to the air supplied by the blower 5, and consequently this air will tend to prevent or counteract the escape flow of air from the cushion to atmosphere. An air seal will consequently be formed along the periphery of bottom 3 by the inclined nozzle arrangement of the present invention.

It is apparent that the pressure in the space 9 will raise the vehicle in relation to its supporting water surface, and on the other hand, it will lower the level of the water underneath the vehicle in comparison with the water level located outside of the vehicle and not subjected to air pressure. It is further apparent that the lift H and the depth A of the depression of the water level are a function of the pressure in the space 9, and of the carried weight. The arrangement and position of nozzle 7 and the surfaces 10 located within the vehicle 1 and forming an air curtain at the periphery of the vehicle are to a substantial extent responsible for the amount of air required to maintain a predetermined lift H.

The air blowing openings 7 may be located in a row along the periphery of the body 1 and may be provided with separate blowers 5, all of which operate in parallel.

To move the vehicle 1 horizontally, it is possible to use a recoil-producing device such as propellers 20, or a jet drive. In the embodiments shown the propellers 20 are each supported by a stabilizer member 21 and driven in conventional manner by combustion engines (not shown).

When pressure in the space 9 is diminished, the vehicle is guided and steered by hydrodynamically operating rudders 22. The vehicle is so constructed that it can float on water when pressure in the space 9 is diminished.

The apparatus shown in FIGURES 3 and 4 of the drawings operates on the principle of polyflow current, namely, a double current and consequently provides for two peripheral air seals. Such construction, wherein the edge portions of the device are of a special form, is advantageous in that the entire pressure gradient is divided into steps, so that the amount of lost air which escapes to the sides of the vehicle is still further reduced.

In FIGURE 3 the lost air continuously escaping from the sides of the vehicle is indicated by the arrow 11. This air is continuously replaced by new air which is sucked by the blowers 12 through a plurality of radially directed channels 13 (only one shown) and is then blown into the space 9 through an annular nozzle 14. To this end the channels 13 communicate with an annular distribution chamber 13a from which the blowers 12 receive the air and feed it into an annular pressure chamber 14a communicating with the annular nozzle 14. In accordance with this construction, this air which is indicated by the arrows 15 in FIGURE 3, after having moved along an inwardly inclined path will reverse its direction, as indicated by the arrow 16, due to the fact that the pressure in space 9 is higher toward its center than at the periphery thereof. Some of this air will be sucked into an annular channel 19 which is upwardly and outwardly directed with respect to the vehicle and feeds blowers 18 which then eject this air through an annular nozzle 23 over an annular pressure chamber 23a. It is to be noted that the pressure of the air in chamber 23a is lower than that in chamber 14a but higher than atmospheric pressure. As indicated by arrow 17 some of the air ejected by nozzle 23 will flow radially inward and after mixing with air from flow 16 will again enter channel 19. Thus a certain amount of air from flow 17 is continuously circulated while another portion indicated by arrow 11 will escape into the atmosphere. This lost portion 11 of the air which forms a part of the closed flow circuit located at the periphery of the apparatus, is not usable any more as far as the lift and pressure effects are concerned.

It is apparent that the blowers, the cross-sections of the air flow, and the speeds of the air flow are so adjusted in relation to each other that the pressures from one step to the other, that is, from one closed circuit to the other, are reduced by such a predetermined extent that the lost amount of air will be as small as possible.

Since the channels and the openings extend along the entire periphery of the bottom surface of the apparatus, it is necessary to provide a large number of blowers operating parallel to each other along the periphery.

In the example illustrated, two rows of several air blowing openings or nozzles 14 and 23 are located along the periphery of the bottom 3 of the vehicle, each of the air blowing openings being connected with a separate channel 13 or 19 operated by a separate blower 12 or 18. Suitable means are provided to operatively connect the drive of each blower of the outer row with a separate blower of the inner row. The air suction channels 19 of the outer row are in communication with the space 9 between the body 1 and the supporting water surface 2. On the other hand, the air suction openings 13 which are in communication with the inner row of air blowing openings 14, extend to the sides of the body 1.

It is apparent that the examples shown above have been given solely by way of illustration and not by way of limitation and are capable of many variations and modifications. For example, if the apparatus is to be used for movement over firm ground, it can be provided with wheels (not shown). Furthermore, instead of using several blowers, it is possible to arrange a single blower in the middle of the apparatus and to provide along the periphery of the apparatus a plurality of air blowing openings which are connected by suitable channels with the pressure side of the blower. All such and other variations and modifications are to be included within the scope of the present invention.

Tests with an existing model having a length of 5 ft., a width of 3 ft. and a weight of 33 lbs. and being provided with a fan motor of .1 h.p. show that the model will be lifted by 3/8" from a solid surface due to the air pressure created therebelow by the fan.

What is claimed is:

1. A vehicle having a bottom, said vehicle comprising means forming an outer row of air blowing openings, an inner row of air blowing openings, said air blowing openings being located upon the bottom of the vehicle along the periphery thereof, separate air suction openings for said rows of air blowing openings and separate channels interconnecting said air suction openings and said air blowing openings; separate blowers located in said channels for transporting air through said channels and blowing it under said bottom through said air blowing openings, and means operatively interconnecting a blower located in a channel communicating with an air blowing opening of an outer row with a separate blower located in a channel communicating with an air blowing opening of an inner row, the air suction openings for the outer row of the air blowing openings being located upon the bottom of the vehicle.

2. The method of supporting a body, having a substantially airtight undersurface, above and in close proximity to a generally-horizontal fixed lower surface, the steps comprising: sucking air into said body from a location outside of the periphery of said undersurface; emitting the sucked-in air from said body, about substantially the entire periphery of said undersurface, in the form of a downwardly directed jet-like substantially endless curtain of air, said curtain also being directed inwardly about at least a major portion of said periphery and being of sufficient velocity and volumetric flow rate to increase the pressure of the air between said undersurface and the fixed surface sufficiently to elevate said body to a stable position above the fixed surface wherein the volumetric rate of flow of air outwardly from between said surfaces substantially equals the volumetric rate of flow of air being sucked into said body; and increasing the resistance to the flow of air outwardly from between the surfaces by sucking at least a portion of the outwardly flowing air back into the body, emitting the sucked-in portion in the form of a second downwardly directed jet-like endless curtain of air spaced outwardly of the first-mentioned curtain, and sucking at least a portion of the air of said second curtain back into the body along with the first-mentioned portion.

3. The method defined in claim 2 in which the second curtain is also directed inwardly about at least a major portion of the periphery of the undersurface.

4. The method of supporting a body, having a substantially airtight undersurface, above and in close proximity to a generally-horizontal fixed lower surface, the steps comprising: sucking air into said body from a location outside the periphery of the undersurface and emitting the sucked-in air beneath said body to develop between said undersurface and the fixed surface a cushion of air under superatmospheric pressure sufficient to elevate said body to a stable position above the fixed surface wherein the volumetric rate of flow of air outwardly from between said surface substantially equals the volumetric rate of flow of air being sucked into said body; and increasing the resistance to the flow of air peripherally outwardly of the body from between said surfaces by sucking at least a portion of the outwardly flowing air back into said body at a location peripherally outwardly of the location where the air was emitted; emitting the last-mentioned sucked-in portion in the form of a downwardly directed jet-like curtain of air extending along the periphery of said undersurface peripherally outwardly of the location where the last-mentioned portion was sucked-in, and sucking at least a portion of the air of said curtain back into said body along with said first-mentioned portion.

5. The method defined in claim 4 in which the curtain is also directed inwardly about at least a major portion of the periphery of the undersurface.

6. The method defined in claim 4 in which the curtain is endless.

7. The method defined in claim 4 including the additional step of propelling the body horizontally while in its stable position above the fixed surface.

8. A ground effect vehicle comprising: a body having a substantially airtight undersurface; means mounted to said body for sucking in air from a location outside the periphery of said undersurface and emitting the sucked-in air in the form of a downwardly directed jet-like substantially endless curtain of air surrounding the periphery of said undersurface, said curtain also being directed inwardly about at least a major portion of said periphery and having a flow rate sufficient to increase the pressure between said undersurface and a fixed lower generally-horizontal surface sufficiently to elevate said body to a stable position above said fixed surface wherein the volumetric rate of flow of air outwardly from between said surfaces substantially equals the sucking-in rate; and means mounted to said body for sucking-in at least a portion of the air flowing peripherally outwardly from between said surfaces and for emitting said sucked-in portion in the form of a second downwardly-directed jet-like endless curtain of air spaced outwardly of said first-mentioned curtain and directed so that at least a portion of the air of said second curtain is sucked in along with said first-mentioned portion of air.

9. A ground effect vehicle comprising: a body having a substantially airtight undersurface; means mounted to said body for sucking in air from a location outside the periphery of said undersurface and emitting the sucked-in air beneath said undersurface at a rate sufficient to develop between said undersurface and a lower fixed generally-horizontal surface a cushion of air under superatmospheric pressure sufficient to elevate said body to a stable position above the fixed surface wherein the volumetric rate of flow of air outwardly from between said surfaces equals said sucking-in rate; and means mounted to said body for sucking in at least a portion of the air flowing outwardly from between said surfaces at a location peripherally outwardly of where said air was emitted and for emitting said sucked-in portion in the form of a downwardly directed jet-like curtain of air extending about the periphery of said undersurface and directed so that at least a portion of the air of said curtain is sucked in along with said first-mentioned portion.

10. The structure defined in claim 9 wherein the curtain is endless and also directed inwardly about at least a major portion of the periphery of the undersurface.

11. A ground effect vehicle comprising: a body having a substantially airtight undersurface; means mounted to said body for sucking in air from a location outside the periphery of said undersurface and emitting the sucked-in air beneath said undersurface at a rate sufficient to develop between said undersurface and a lower fixed generally-horizontal surface a cushion of air under superatmospheric pressure sufficient to elevate said body to a stable position above the fixed surface wherein the volumetric rate of flow of air outwardly from between said surfaces equals said sucking-in rate; inner and outer concentric downwardly-facing substantially endless channels in the periphery of said undersurface; a wall separating said channels; and air blowing means in said wall adjacent the bottom of said channels for sucking air into said inner channel and discharging the sucked-in air from said outer channel in the form of a downwardly directed endless jet-like curtain.

12. The structure defined in claim 11 in which the channels are inclined downwardly and inwardly about at least a major portion of their extents.

13. The method of supporting a body, having a substantially airtight undersurface, above and in close proximity to a pressure-retaining lower surface, the steps comprising: emitting air under pressure from and beneath the body to develop between the undersurface and a lower surface a cushion of air under superatmospheric pressure sufficient to lift the body to a stable elevation above the lower surface; and retarding the flow of air outwardly from between the surfaces along at least a portion of the periphery of the undersurface by emitting from the body a downwardly-directed jet-like curtain of air extending along the peripheral portion of the undersurface, and spaced outwardly of the location where the air was emitted to develop the cushion.

14. The method of supporting a body, having a substantially airtight undersurface, above and in close proximity to a pressure-retaining lower surface, the steps comprising: emitting air from said body in the form of a downwardly and inwardly-directed jet-like curtain extending along at least a portion of the periphery of the undersurface and being of sufficient velocity and volumetric flow rate to create between the undersurface and a pressure-retaining lower surface a cushion of air under superatmospheric pressure sufficient to lift the body to a stable elevation above the lower surface; and retarding the flow of air outwardly from between the surfaces along the peripheral portion by emitting from the body a second downwardly-directed jet-like curtain of air substantially coextensive with and spaced outwardly of the first-mentioned curtain.

15. The method defined in claim 14 including the additional step of sucking air into the body between the curtains and using the sucked-in air to form the second curtain.

16. A ground effect vehicle comprising: a body having a substantially airtight undersurface; means mounted to said body for emitting therefrom a downwardly-directed jet-like curtain of air extending along at least a portion of the periphery of said undersurface and of sufficient velocity and flow rate to develop between said undersurface and a lower pressure-retaining surface a cushion of air under superatmospheric pressure sufficient to lift said body to a stable elevation above the lower surface; means mounted to said body for propelling the same horizontally while elevated above the lower surface; and means mounted to said body for emitting therefrom a second downwardly-directed jet-like curtain of air substantially coextensive with and spaced outwardly of said first-mentioned curtain for retarding the flow of air outwardly from between the surfaces along the peripheral portion.

17. The structure defined in claim 16 in which the emitting means includes impeller means, and including duct means for supplying said impeller with air, said duct means having an inlet facing in the direction of horizontal movement of the body and unobstructedly exposed to the flow of air therepast during such movement.

18. The structure defined in claim 16 in which the second curtain emitting means includes impeller means, and including duct means in said body having a downwardly-facing inlet disposed between the curtains for supplying air to said impeller means.

References Cited by the Examiner
UNITED STATES PATENTS

| | | |
|---|---|---|
| 936,395 | 10/1909 | Worthington. |
| 1,838,354 | 12/1931 | Bauer _____ 244—23 |
| 2,444,318 | 6/1948 | Warner. |
| 2,483,663 | 10/1949 | Nowak. |
| 2,567,392 | 9/1951 | Naught. |
| 2,734,699 | 2/1956 | Lippisch _____ 244—23 |

(Other references on following page)

UNITED STATES PATENTS

| | | |
|---|---|---|
| 2,838,257 | 6/1958 | Wibault _____ 244—23 |
| 2,880,945 | 4/1959 | Crane. |
| 2,922,277 | 1/1960 | Bertin. |
| 2,939,649 | 6/1960 | Shaw. |

OTHER REFERENCES

Publication: National Advisory Committee For Aeronautics, Technical Note 3982, April 1957, NACA TN 3982.

Publication: Department of the Navy, David Taylor Model Basin, Aerodynamics Laboratory, Research and Development Report, Report 1373, Aero Report 923, July 1957.

A. HARRY LEVY, *Primary Examiner*.

EMILE PAUL, WILLIAM KANOF, PHILIP ARNOLD, *Examiners*.

E. A. POWELL, *Assistant Examiner*.